US009694673B2

(12) United States Patent
Beauchaine et al.

(10) Patent No.: US 9,694,673 B2
(45) Date of Patent: Jul. 4, 2017

(54) TANK ASSEMBLY WITH RETAINING RING

(71) Applicant: Nissan North America, Inc., Franklin, TN (US)

(72) Inventors: Carson Beauchaine, Wixom, MI (US); David Grant, Commerce, MI (US); Jonathan P. Sussman, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 77 days.

(21) Appl. No.: 14/866,477

(22) Filed: Sep. 25, 2015

(65) Prior Publication Data
US 2017/0087979 A1 Mar. 30, 2017

(51) Int. Cl.
*B60K 15/03* (2006.01)
*B60K 15/01* (2006.01)

(52) U.S. Cl.
CPC .............. *B60K 15/03* (2013.01); *B60K 15/01* (2013.01); *B60K 2015/03164* (2013.01); *B60K 2015/03243* (2013.01); *B60K 2015/03447* (2013.01); *B60K 2015/03453* (2013.01)

(58) Field of Classification Search
CPC .................... B60K 15/03; B60K 15/01; B60K 2015/03453; B60K 2015/03447; B60K 2015/03164; B60K 2015/03243; F02M 2037/225; F02M 37/0052
USPC ........ 123/509; 220/562; 277/590; 292/256.6
See application file for complete search history.

(56) References Cited

U.S. PATENT DOCUMENTS

| | | | | |
|---|---|---|---|---|
| 3,557,993 A | * | 1/1971 | DePew | B60K 15/0406 220/246 |
| 5,207,463 A | * | 5/1993 | Seizert | B60K 15/01 220/298 |
| 5,975,116 A | * | 11/1999 | Rosas | B60K 15/03519 137/202 |
| 6,533,288 B1 | | 3/2003 | Brandner et al. | |
| 6,698,799 B2 | * | 3/2004 | Anderson | B60K 15/04 285/139.1 |
| 6,755,422 B2 | * | 6/2004 | Potter | F16J 15/104 277/627 |
| 7,341,047 B2 | | 3/2008 | Sone et al. | |
| 8,419,021 B2 | | 4/2013 | Mellander | |

(Continued)

FOREIGN PATENT DOCUMENTS

KR    10-0930661 B1    12/2009

*Primary Examiner* — Joseph Dallo
*Assistant Examiner* — Scott A Reinbold
(74) *Attorney, Agent, or Firm* — Young Basile Hanlon & MacFarlane, P.C.

(57) ABSTRACT

To assist in maintaining a seal ring in a proper position in a fuel tank assembly, a retaining ring is utilized. The retaining ring surrounds the seal ring to provide a physical barrier to restrict the seal ring. The assembly includes a tank having an opening and a plurality of flanges located about the opening, a fuel pump module, the retaining ring and a seal ring. The retaining ring is located within the plurality of flanges, positioned around the opening and the fuel pump module. The seal ring is located within the plurality of flanges, positioned around the opening and the fuel pump module such that in a radial direction the seal ring is positioned between the fuel pump module and the retaining ring, and in an axial direction the seal ring is positioned between the fuel pump module and the fuel tank.

18 Claims, 4 Drawing Sheets

(56) References Cited

U.S. PATENT DOCUMENTS

| | | |
|---|---|---|
| 8,556,109 B2 | 10/2013 | Fujita |
| 2003/0098307 A1* | 5/2003 | Hagano ............. B60K 15/0406 220/303 |
| 2004/0021271 A1 | 2/2004 | Tratnik |
| 2005/0194796 A1 | 9/2005 | Powell |
| 2007/0062841 A1* | 3/2007 | Nakamura ....... B60K 15/03177 206/562 |
| 2012/0187131 A1 | 7/2012 | Claucherty |

* cited by examiner

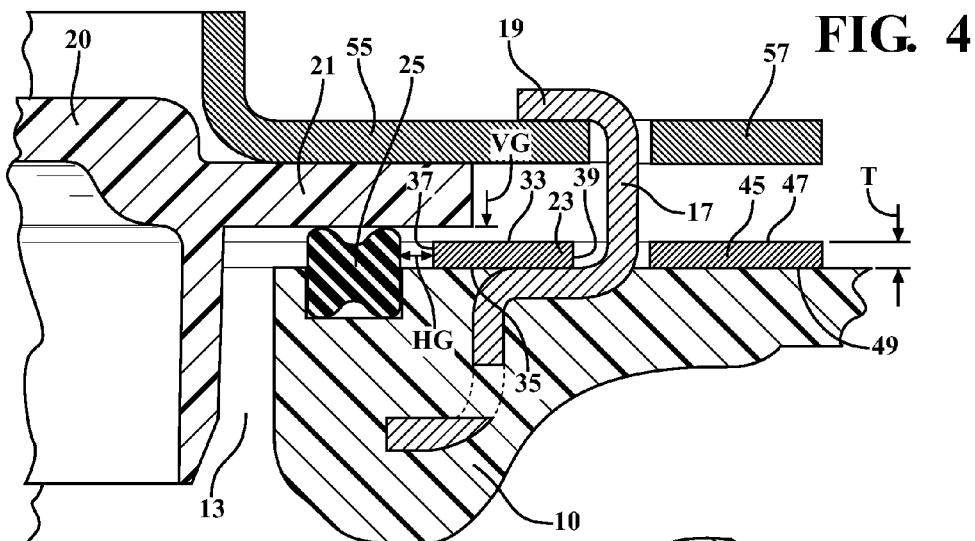
FIG. 4
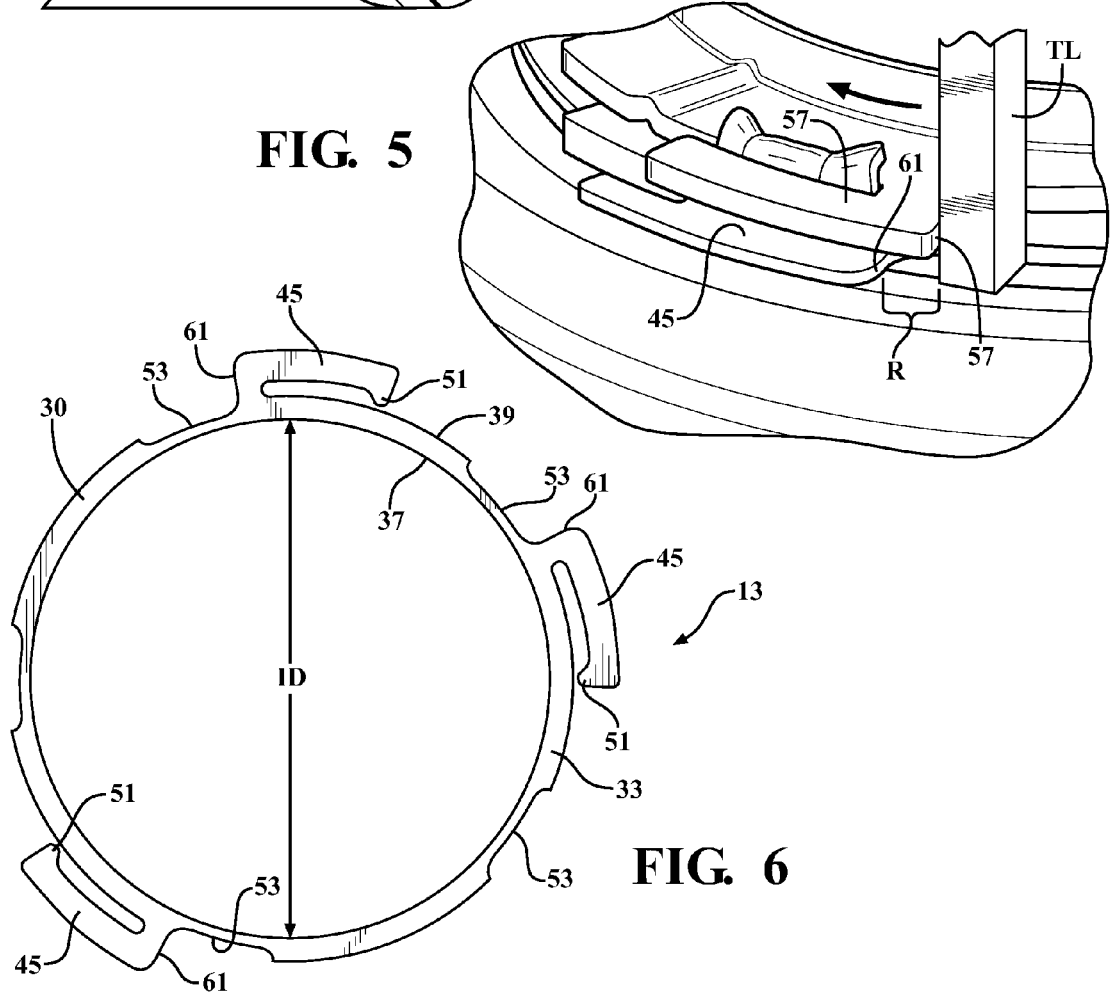
FIG. 5
FIG. 6

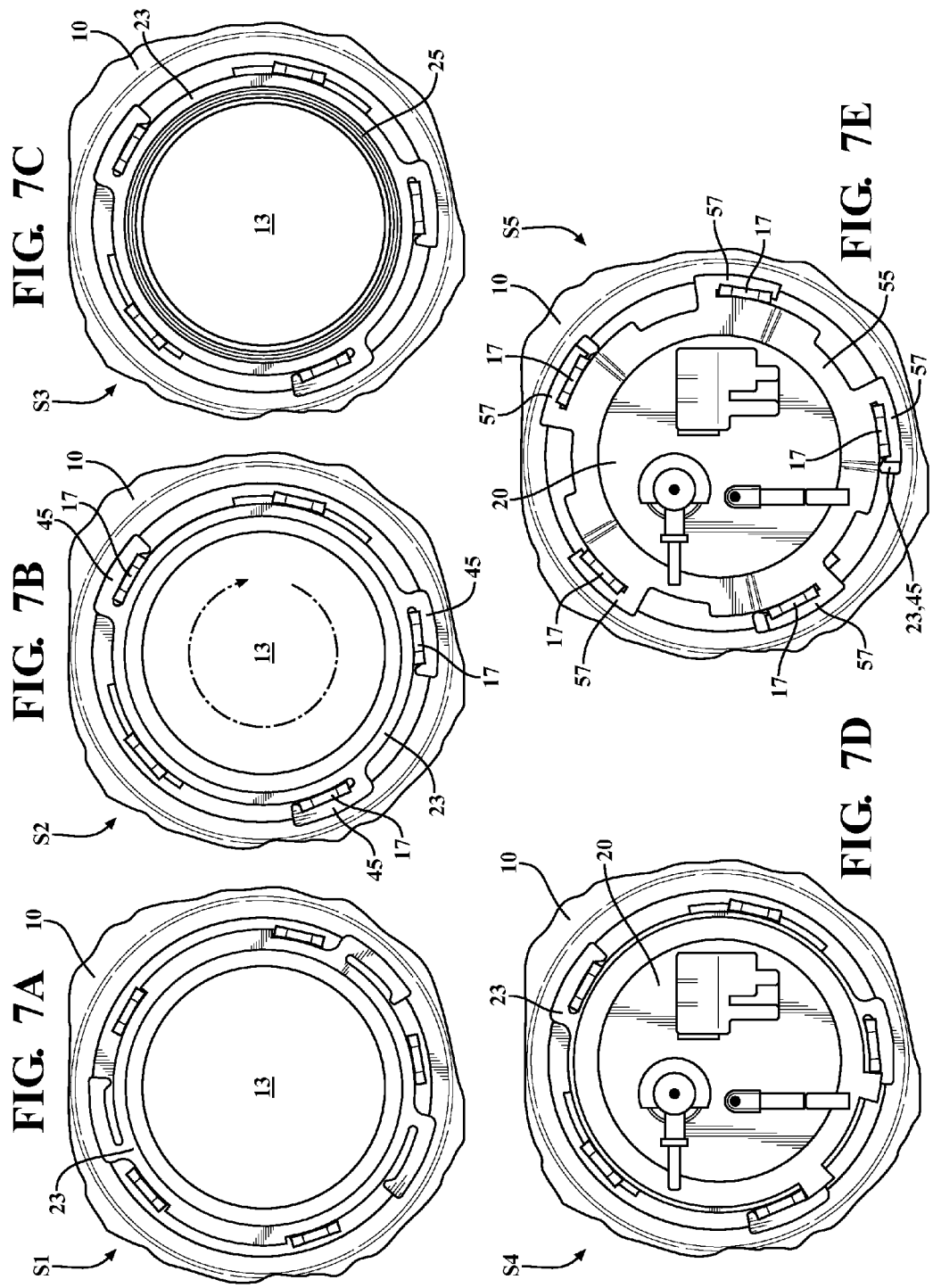

TANK ASSEMBLY WITH RETAINING RING

FIELD OF THE INVENTION

The disclosure relates to the field of fuel storage assemblies for vehicles.

BACKGROUND

Liquid fuel to power a vehicle is typically stored in a fuel tank. The fuel tank has an opening to allow the ingress and egress a liquid fuel into and out of the tank. Fuel module is used within the opening to allow attachment of various hoses tubes and other devices to the tank. A seal ring is used between the fuel tank in the fuel module to provide a seal between the fuel module and the fuel tank.

The ring seal is located within a groove between opposing side walls surrounding the opening of the fuel tank. The sidewalls assist in maintaining the ring seal in the proper location.

The fuel tank has a main body and a series of flanges for securing the fuel module. The main body is typically made an injected material such as plastic. The plastic is injected and flows around the flanges which may be made of metal. The groove and opposing side walls may be formed out of plastic as part of the main body.

A problem exists however, as various material and design choices may make achieving desired geometric dimensions and tolerances of the groove and opposing side walls difficult. For example, the flanges may interfere with the flow of material forming the main body such that formation of the outermost opposing wall surrounding the groove is inhibited. Accordingly new apparatus and methods are desired to assist in retaining the seal ring in the proper position.

SUMMARY

A retaining ring to aid in positioning a seal ring is taught herein.

One aspect of the disclosed embodiments is an assembly for storing fuel. The assembly includes a tank having an opening and a plurality of flanges, fuel pump module, a retaining ring and a seal ring. The opening is defined by a perimeter, with the plurality of flanges located about the perimeter. The fuel pump module is partially located within the opening. The retaining ring is located within the plurality of flanges, positioned around the opening and the fuel pump module. The seal ring is located within the plurality of flanges, positioned around the opening and the fuel pump module such that in a radial direction the seal ring is positioned between the fuel pump module and the retaining ring, and in an axial direction the seal ring is positioned between the fuel pump module and the fuel tank.

Another aspect of the disclosed embodiments is an apparatus for retaining a seal ring about an opening of a fuel tank. The apparatus includes a main body having a generally disc shaped form. The generally disk shaped form is defined by a top surface, a bottom surface, an inner surface and an outer surface. A diameter of the inner surface is greater than an outer diameter of the seal ring. A tab extends away from the main body at the outer surface. The tab is generally L-shaped, having an upper surface and a lower surface. The upper surface of the tab aligns with the top surface of the main body. The lower surface of the tab aligns with the bottom surface of the main body.

Another aspect of the disclosed embodiments is a method of assembling a fuel tank assembly. The method involves providing a tank with an opening, a retaining ring, a seal ring, a fuel pump module and a lock ring. First, the retaining ring is placed about the opening of the tank, and the retaining ring is engaged with the tank. Next, the seal ring is placed about the opening of the tank and within the retaining ring. Then, the fuel pump module is placed within the opening of the tank. Finally, the lock ring is placed around the pump module, and engaged with the tank.

BRIEF DESCRIPTION OF THE DRAWINGS

The description herein makes reference to the accompanying drawings wherein like referenced numerals refer to like parts throughout the several views, and wherein:

FIG. 4 is an illustration showing a cross sectional view of a portion of a tank assembly in a compressed condition;

FIG. 5 is an illustration showing a side perspective view of a retaining tab and a lock tab;

FIG. 6 is an illustration a top view of a retaining ring;

FIG. 7A is an illustration of a step in a method to assemble the tank assembly;

FIG. 7B is an illustration of a step in the method to assemble the tank assembly;

FIG. 7C is an illustration of a step in the method to assemble the tank assembly;

FIG. 7D is an illustration of a step in the method to assemble the tank assembly; and FIG. 7E is an illustration of a step in the method to assemble the tank assembly.

DETAILED DESCRIPTION

Figure 1:
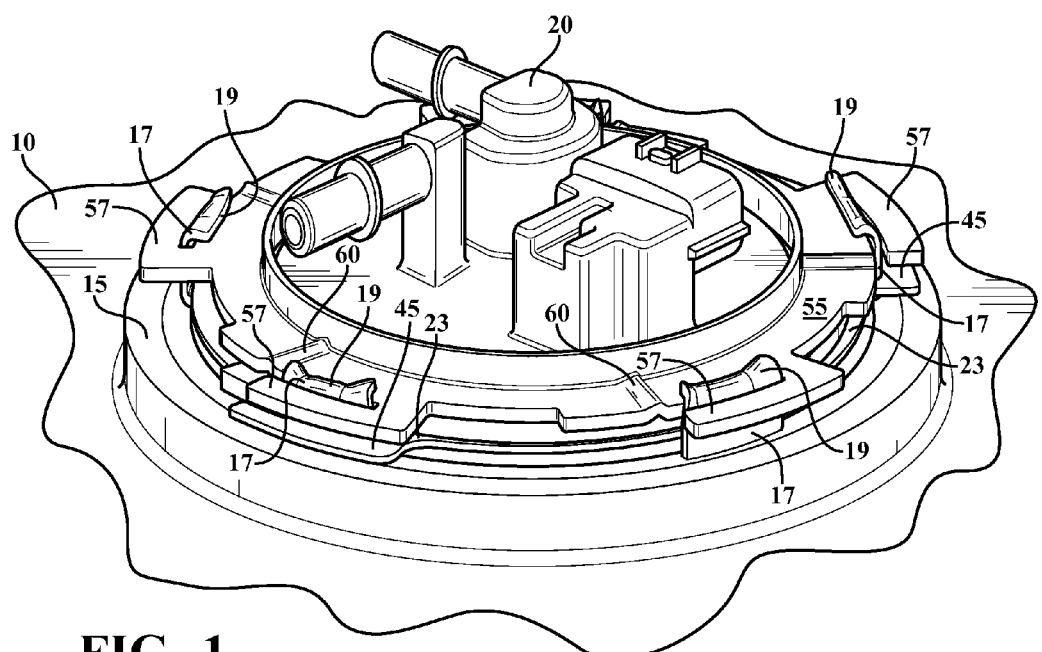
FIG. 1 is an illustration showing a perspective view of a portion of a tank assembly.

To assist in maintaining a seal ring in a proper position in a fuel tank assembly, a retaining ring is utilized. The retaining ring surrounds the seal ring to provide a physical barrier to restrict the seal ring.

FIGS. 1-4 show a portion of a tank 10 for storing fuel to be used in a vehicle. The tank 10 includes an opening 13. The opening 13 is defined by a perimeter 15. The perimeter 15 also defines an axial direction AX and a radial direction RD. The radial direction RD includes multiple directions all sharing the common characteristic of beginning in a center of the opening 13 and extending towards the perimeter 15, running generally parallel to a plane of the perimeter 15. The axial direction AX is a direction generally normal to the plane of the perimeter 15, the axial direction AX is also perpendicular to the radial direction RD.

The tank 10 also includes a plurality of flanges 17. The flanges 17 are located about the perimeter 15. The flanges 17 extend generally parallel to the axial direction AX and curve inwardly toward the center of the opening 13 at terminal ends 19 of the flanges 17.

A fuel pump module 20 is partially located within the opening 13 of the tank 10. The fuel pump module 20 may include multiple ports and attachment points for various fuel and ventilation lines. The fuel pump module 20 includes an outer flange 21. The outer flange 21 of the fuel pump module 20 extends outwardly surrounding the fuel pump module 20. The outer flange 21 extends far enough to cover the opening 13 when the fuel pump module 21 is installed in the assembly.

A retaining ring 23 is located within the plurality of flanges 17. The retaining ring 23 is positioned around the opening 13 and the fuel pump module 20.

A seal ring 25 is also located within the plurality of flanges 17. The seal ring 25 is positioned around the opening 13 and the fuel pump module 20 such that in the radial direction RD the seal ring 25 is positioned between the fuel pump module 20 and the retaining ring 23. The seal ring 25 is also positioned such that in the axial direction AX the seal ring 25 is positioned between the fuel pump module 20 and the perimeter 15 of the opening 13 on the fuel tank 10.

Figure 3:
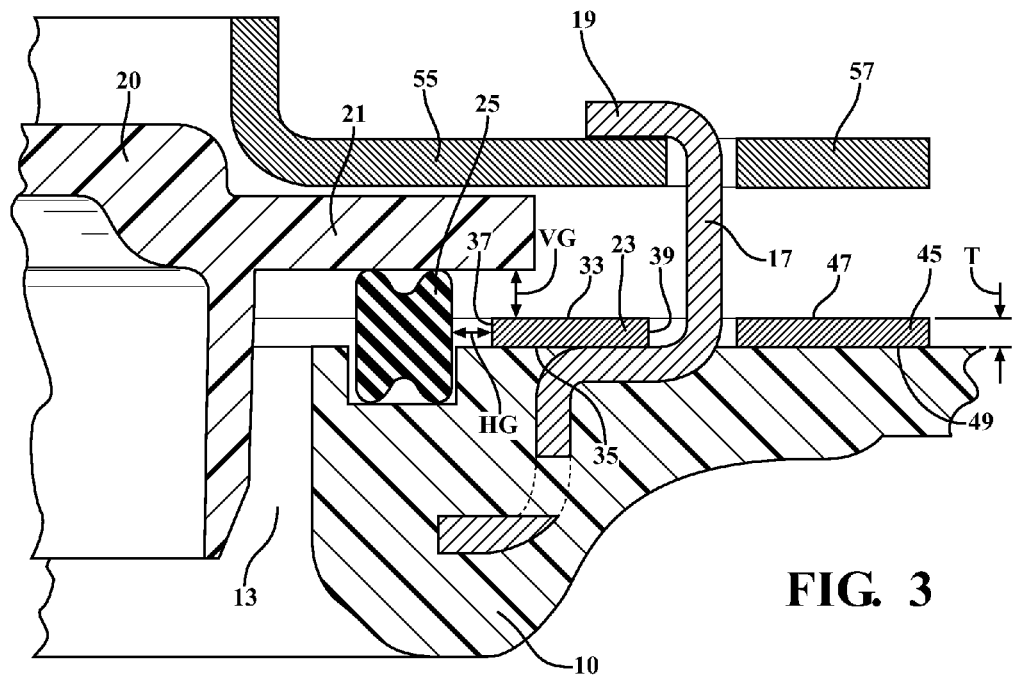
FIG. 3 is an illustration showing a cross sectional view of a portion of a tank assembly in an uncompressed condition.
Figure 2:
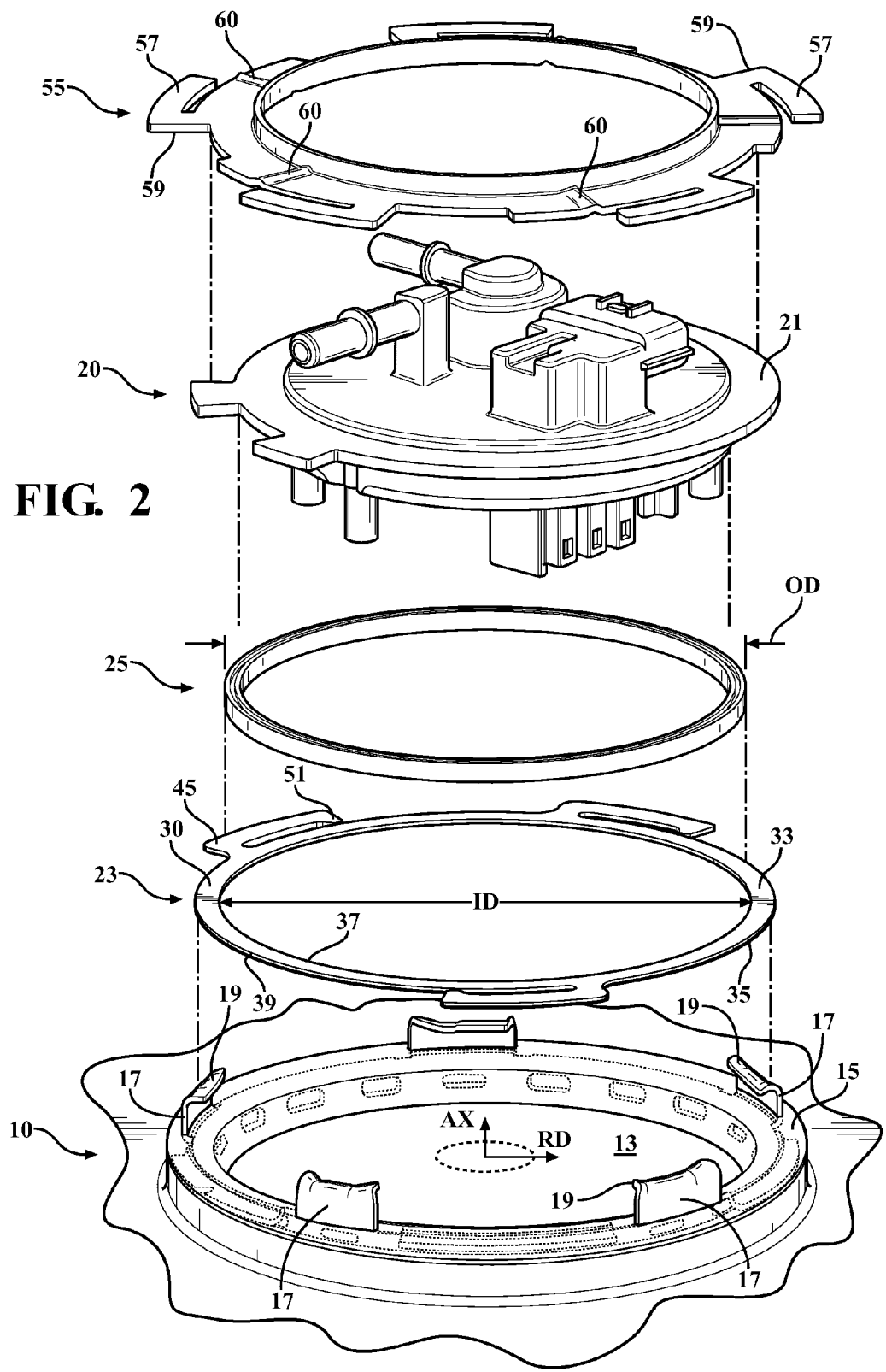
FIG. 2 is an illustration showing an exploded view of the tank assembly of FIG. 1.

The seal ring 25 is circular in form with a generally X-shaped (or H-shaped) cross-section, as shown in FIGS. 3 and 4. The seal ring 25 has an outer diameter OD, as shown in FIG. 2. The seal ring 25 may be made of rubber or other flexible material to provide a fluid tight barrier between the seal ring 25 and various structures which the seal ring 25 abuts. For example the X-shaped cross-section of the seal ring 25 provides two barriers where the seal ring 25 contacts the tank 10 at the perimeter 15 and also provides two barriers where the seal ring 25 contacts the fuel pump module 20 at the outer flange 21.

The retaining ring 23 includes a main body 30. The main body 30 is generally disc shaped, defined by a top surface 33, a bottom surface 35, an inner surface 37, and an outer surface 39. The inner surface 37 of the retaining ring 23 has an inner diameter ID.

The inner diameter ID of the inner surface 37 of the retaining ring 23 is greater than the outer diameter OD of the seal ring 25. The relationship between the inner diameter ID of the retaining ring 23 and the outer diameter OD of the seal ring 25 enables the seal ring 25 to be located within the retaining ring 23 in the assembly, without the retaining ring 23 interfering with the shape of the seal ring 25. To insure no interface, and good barrier formation, the inner diameter ID of the retaining ring, and the outer diameter OD of the seal ring, may be dimensioned relative to each other to provide a horizontal gap space HG between the retaining ring 23 and the seal ring 25.

To further ensure good barrier formation, a thickness T of the retaining ring 23 may be dimensioned to provide a vertical gap space VG between the retaining ring 23 and the fuel pump module 20.

The retaining ring 23 further includes one or more tabs 45 extending away from the main body 30 at the outer surface 39 of the retaining ring 23. The tabs 45 have an upper surface 47 and a lower surface 49. The upper surface 47 of the tabs 45 aligns with the top surface 33 of the main body 30. The lower surface 49 of the tabs 45 aligns with the bottom surface 35 of the main body 30. The retaining ring 23 is also shown in FIG. 6.

When viewed from above or below, the upper surface 47 and lower surface 49 of the tabs 45 of the retaining ring 23 are generally L-shaped, as shown in FIGS. 2 and 6. The tabs 45 of the retaining ring 23 engage the flanges 17 by receiving the flanges 17 in an area between the tabs 45 and the main body 30.

The tabs 45 may also include a locking portion 51. The locking portion 51 of the tab 45 extends away from the tab 45 towards the main body 30 of the retaining ring 23 at a distal end 52 of the tab. The locking portion 51 helps to maintain engagement between the retaining ring 23 and the tank 10.

Various numbers of tabs 45 extending from the main body 30 may be used. For example the total amount of tabs 45 on the retaining ring 23 maybe less than the total amount of flanges 17 surrounding the opening 13 of the fuel tank 10. Reducing the number of tabs 45 on the retaining ring 23 in this manner assists in installation of the retaining ring 23 as interference between the tabs 45 and the flanges 17 is reduced.

Additionally the flanges 17 maybe located to provide an assembler (person or machine assembling the apparatus) with a grasping position on the retaining ring 23. For example, using tabs 45 located and positioned on opposing sides of the retaining ring 23 provides opposing areas where the assembler can grasp, for example with their right and left hands. When an odd number of flanges 17 exists on the tank 10 having symmetrically opposing tabs 45 on the retaining ring 23 may be difficult. In such a situation it may desirable to utilize three tabs 45, with two tabs 45 adjacent each other and one tab 45 opposing. In this configuration it may be desirable to only use three tabs 45 to provide an easier assembly process as discussed above.

In addition to the number and location of tabs 45, the retaining ring 23 main include other specialized features to ease installation of the retaining ring 23 into the assembly. For example, the inwardly curving terminal ends 19 of the flanges 17 may interfere with the placement of the retaining ring 23 into its proper location. To overcome this difficulty the retaining ring 23 may be made of a flexible elastic material such as polyoxymethylene (POM or acetal). Making the retaining ring 23 of the flexible elastic material allows the retaining ring 23 to bend to avoid the terminal ends 19 of the flanges 17, with the retaining ring 23 returning to its original shape when placed into its proper position. Additionally the outer surface 39 of the retaining ring 23 may include a series of recesses 53. The recesses 53 along the outer surface 39 of the retaining ring 23 maybe spaced so as to align with the flanges 17. As shown in FIG. 6.

A lock ring 55 is also located within the plurality of flanges 17. The lock ring 55 includes a plurality of lock tabs 57 and a series of retention notches 60. The retention notches 60 are upside-down V-shaped portions that extend upwardly at various positions around the lock ring 55. The retention notches 60 may be formed place a series of bends in the lock ring 55, for example, with a press. The lock ring 55 is positioned around the opening 13 of the tank 10 and the fuel pump module 20. The lock ring 55 is positioned underneath the inward curve at the terminal ends 19 of the flanges 17. The retaining ring 23 seal ring 25 and portions of the fuel pump module 20 are sandwiched between the lock ring 55 and the perimeter 15 of the tank 10.

When the lock ring 55 is included into the assembly, the seal ring 25 is compressed. When the seal ring 25 is compressed the height of the seal ring 25 is generally shortened and the width of the seal ring 25 is generally increased. For example FIG. 4 shows the seal ring 25 in an uncompressed condition whereas FIG. 5 shows the seal ring 25 in a compressed position.

The lock tabs 57 on the lock ring 55 include a back edge 59. The tabs 45 on the retaining ring 23 may also include a back edge 61. The back edge 61 of the retaining ring 23 is located opposite the distal end 52. When the lock ring 55 is installed, it is rotated such that the flanges 17 are engaged within the lock tabs 77. During the rotation, the retention notches 60 traverse underneath the terminal end 19 of the flanges 17. Such installation may be difficult and require the use of tooling T and or machines.

The tabs 45 on the retaining ring 23 and the lock tabs 57 on the lock ring 55 are designed to prevent the tooling T used to install a lock ring 55 from applying a force on the tabs 45 of the retaining ring 23. To prevent such application of force on the tabs 45, the back edge 61 of the tabs 45 on the retaining ring 23 is spaced apart circumferentially R from the back edge 59 of the lock tabs 57 on the lock ring 55 in a rotational direction, as shown in FIG. 5. In this manner, clearance space is provided between the tooling T used to install the lock ring 55 and the tabs 45 with retaining ring 23.

With reference to FIGS. 7A-7E, a method of assembling the assembly begins with providing the tank 10 with the opening 13, the retaining ring 23, the seal ring 25, the fuel pump module 20, and the lock ring 55. After these items are provided, the retaining ring 23 is placed about the opening 13 of the fuel tank 10 and then engaged with the tank 10. After the retaining ring 23 has been engaged with the tank 10 the seal ring 25 is placed about the opening 13 of the tank 10 within the retaining ring 23. Next, the fuel pump module 20 is placed within the opening 13 of the tank 10. Finally the lock ring 23 is placed on top the fuel pump module 20 and engaged with the tank 10.

The provided items are similar to those discussed above. Placing the retaining ring 23 within, and engaging it to, the tank 10 may involve rotating the retaining ring 23 such that the flanges 17 of the tank 10 are received in the open area between the tabs 45 on the retaining ring 23 and the main body 30 of the retaining ring 23. Placing the seal ring 25 within the retaining ring 23 maybe done by hand such that the seal ring 25 is properly aligned and centered about the opening 13 of the fuel tank 10. Placing the fuel pump module 20 in the open of the tank 10 may also be done by hand. Finally the lock ring 23 is placed by hand or machine on top of the fuel pump module 20 and engaged with the fuel tank 10 by twisting the lock ring 55 such that the flanges 17 are received in the lock tabs 57 on the lock ring 55 similar to the retaining ring 23. A tool or machine maybe used to apply force on the lock tabs 57 to assist in this rotational engagement. When assembled, the outer flange 21 on the fuel pump module 20 is sandwiched between the lock ring 55 and the seal ring 25 in the axial direction, and the seal ring 25 is sandwiched between the outer flange 21 and the tank 10 in the axial direction.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An assembly for storing fuel, the assembly comprising:
   a tank having an opening and a plurality of flanges, the opening defined by a perimeter, the plurality of flanges located about the perimeter;
   a fuel pump module partially located within the opening;
   a retaining ring located within the plurality of flanges, positioned around the opening and the fuel pump module;
   a seal ring, the seal ring located within the plurality of flanges, positioned around the opening and the fuel pump module such that in a radial direction the seal ring is positioned between the fuel pump module and the retaining ring, and in an axial direction the seal ring is positioned between the fuel pump module and the fuel tank,
   wherein the retaining ring includes a main body having a generally disc shaped form, the generally disk shaped form defined by a top surface, a bottom surface, an inner surface and an outer surface, a diameter of the inner surface being greater than an outer diameter of the seal ring; and
   the retaining ring further includes one or more tabs extending away from the main body at the outer surface, the tabs having an upper surface and a lower surface, the upper surface of the tabs aligning with the top surface of the main body, and the lower surface of the tabs aligning with the bottom surface of the main body.

2. The assembly of claim 1, the tabs are generally L-shaped.

3. The assembly of claim 1, wherein a distal end of the tabs includes a locking portion, the locking portion extending away from the tab toward the main body of retaining ring.

4. The assembly of claim 1, wherein the plurality of flanges outnumber the tabs.

5. The assembly of claim 1, wherein the one or more tabs includes at least two tabs, the tabs located generally opposing each other on the retaining ring.

6. The assembly of claim 1, wherein, the one or more tabs includes only three tabs, two of the three tabs located adjacent each other on the retaining ring, and one of the three tabs located generally opposing the other two of the three tabs on the retaining ring.

7. The assembly of claim 1, further comprising:
   a lock ring located within the plurality of flanges, positioned around the opening and the fuel pump module, the lock ring including a plurality of lock tabs having a back edge;
   the retaining ring located between the tank and the lock ring; and
   the each of one or more tabs of the retaining ring having a back edge, the back edge of the tabs of the retaining ring and the back edge of lock tabs are spaced apart circumferentially.

8. The assembly of claim 1, wherein the retaining ring is made of a flexible and elastic material.

9. The assembly of claim 1, wherein an inner diameter of the retaining ring is sufficiently larger than an outer diameter of the seal ring to allow a gap space between the retaining ring and the seal ring in the radial direction of the opening.

10. The assembly of claim 1, wherein, an inner diameter of the retaining ring is sufficiently larger than an outer diameter of the seal ring to allow a gap space between the retaining ring and the seal ring in the radial direction of the opening when the assembly is in a compressed condition.

11. The assembly of claim 1, wherein a thickness of the retaining ring is dimensioned to provide a gap space between the retaining ring and the fuel pump module in the axial direction of the opening.

12. The assembly of claim 1, wherein a thickness of the retaining ring is dimensioned to provide a gap space between the retaining ring and the fuel pump module in the axial direction of the opening when the assembly is in a compressed condition.

13. An apparatus for retaining a seal ring about an opening of a fuel tank, the apparatus comprising:
   a main body having a generally disc shaped form, the generally disk shaped form defined by a top surface, a bottom surface, an inner surface and an outer surface, a diameter of the inner surface being greater than an outer diameter of the seal ring; and
   a tab extending away from the main body at the outer surface, the tab being generally L-shaped, the tab having an upper surface and a lower surface, the upper surface of the tab aligning with the top surface of the main body, and the lower surface of the tab aligning with the bottom surface of the main body.

14. The apparatus of claim 13, further comprising:
a locking portion extending away from a distal end of the tab towards the main body of retaining ring.

15. The apparatus of claim 13, further comprising:
at least two tabs, the tabs located generally opposing each other on the main body.

16. The apparatus of claim 13, further comprising:
at least three tabs, two of the three tabs located adjacent each other on the main body, and one of the three tabs located generally opposing the other two of the three tabs on the main body.

17. The apparatus of claim 13, wherein the outer surface includes a plurality of recesses.

18. A method of assembling a fuel tank assembly, the method comprising:
providing a tank with an opening, a retaining ring, a seal ring, a fuel pump module and a lock ring;
placing the retaining ring about the opening of the tank;
engaging the retaining ring with the tank;
placing the seal ring about the opening of the tank and within the retaining ring, after the retaining seal has been engaged with the tank;
placing the fuel pump module within the opening of the tank;
placing the lock ring around the fuel pump module; and
engaging the lock ring with the tank.

* * * * *